(12) United States Patent
McLennaghan et al.

(10) Patent No.: US 10,590,314 B2
(45) Date of Patent: *Mar. 17, 2020

(54) ADHESIVE COMPOSITION

(71) Applicant: Dow Global Technologies LLC, Midland, MI (US)

(72) Inventors: Allan W. McLennaghan, Lachen (CH); Yi Jin, Missouri City, TX (US); Kate Brown, Houston, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/031,527

(22) Filed: Jul. 10, 2018

(65) Prior Publication Data

US 2018/0320034 A1 Nov. 8, 2018

Related U.S. Application Data

(63) Continuation of application No. 15/505,363, filed as application No. PCT/US2015/046103 on Aug. 20, 2015, now Pat. No. 10,023,770.

(Continued)

(51) Int. Cl.
*C08F 10/06* (2006.01)
*C09J 123/12* (2006.01)
(Continued)

(52) U.S. Cl.
CPC ............. *C09J 123/16* (2013.01); *B32B 5/022* (2013.01); *B32B 7/12* (2013.01); *C08L 23/142* (2013.01); *C09J 7/21* (2018.01); *C09J 7/30* (2018.01); *B32B 2405/00* (2013.01); *C08F 10/06* (2013.01); *C08F 210/06* (2013.01);
(Continued)

(58) Field of Classification Search
None
See application file for complete search history.

(56) References Cited

U.S. PATENT DOCUMENTS 6,362,286 B1 3/2002 Gardiner et al.
9,109,143 B2 8/2015 Tse et al.
(Continued)

FOREIGN PATENT DOCUMENTS

WO 80/00587 A1 4/1980
WO 2006/069205 A1 6/2006
(Continued)

OTHER PUBLICATIONS

LyondellBasell, Technical Datasheet for Adflex Q 100 F, Jan. 13, 2009.

*Primary Examiner* — Richard A Huhn
(74) *Attorney, Agent, or Firm* — Quarles & Brady LLP

(57) ABSTRACT

The present disclosure provides an adhesive composition. The adhesive composition includes:
A) a propylene based plastomer or elastomer (PBPE) comprising up to 15 wt % units derived from ethylene and having
 (i) a Koenig B-value less than 1.0;
 (ii) a total unsaturation per mole of propylene from 0.010% to 0.030%;
 (iii) a density from 0.860 g/cc to 0.890 g/cc;
 (iv) a melt viscosity at 177° C. from 1,000 mPa·s to 15,000 mPa·s; and
(v) a weight average molecular weight from 20,000 to 50,000 g/mole.

20 Claims, 1 Drawing Sheet

Related U.S. Application Data

(60) Provisional application No. 62/040,143, filed on Aug. 21, 2014.

(51) Int. Cl.
*C09J 123/16* (2006.01)
*C08L 23/14* (2006.01)
*C09J 7/30* (2018.01)
*C09J 7/21* (2018.01)
*B32B 5/02* (2006.01)
*B32B 7/12* (2006.01)
*C08L 23/16* (2006.01)
*C08F 210/06* (2006.01)

(52) U.S. Cl.
CPC ...... *C08F 2500/08* (2013.01); *C08F 2500/17* (2013.01); *C08F 2800/20* (2013.01); *C08L 23/16* (2013.01); *C08L 2314/06* (2013.01); *C09J 123/12* (2013.01); *C09J 2400/263* (2013.01); *C09J 2423/16* (2013.01)

(56) References Cited

U.S. PATENT DOCUMENTS

| | | |
|---|---|---|
| 10,023,770 B2* | 7/2018 | McLennaghan ....... C09J 123/16 |
| 10,023,771 B2* | 7/2018 | Jin ......................... C09J 123/16 |
| 2007/0191242 A1 | 8/2007 | Srinivasan et al. |
| 2007/0251572 A1* | 11/2007 | Hoya ................... C08L 23/0815 136/256 |
| 2008/0085977 A1* | 4/2008 | Okamoto ................ C08L 23/10 525/240 |
| 2009/0105407 A1* | 4/2009 | Karjala .................. C08F 10/00 524/547 |
| 2010/0285253 A1 | 11/2010 | Hughes et al. |
| 2011/0054117 A1 | 3/2011 | Hall |
| 2011/0172348 A1 | 7/2011 | Hoya et al. |
| 2015/0267087 A1 | 9/2015 | Botros |
| 2017/0247584 A1 | 8/2017 | Jin |

FOREIGN PATENT DOCUMENTS

| WO | 2009/067337 A1 | 5/2009 |
| WO | 2010/078479 A1 | 7/2010 |
| WO | 2016/029006 A1 | 2/2016 |

\* cited by examiner

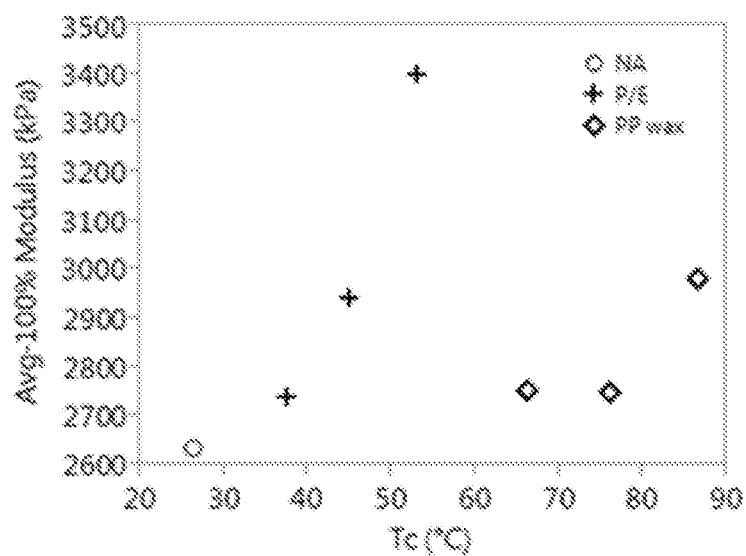

ADHESIVE COMPOSITION

REFERENCE TO RELATED APPLICATIONS

The present application is a continuation of U.S. application Ser. No. 15/505,363, filed Feb. 21, 2017, which is a 371 of international application no. PCT/US2015/046103, filed Aug. 20, 2015, which claims priority to U.S. Provisional Application Ser. No. 62/040,143, filed Aug. 21, 2014, the entire content of which is incorporated by reference herein to the extent that the language is not inconsistent with the instant application.

BACKGROUND

Adhesive compositions have a solidification temperature which is a key parameter that can affect the utility of the adhesive composition for a given application. If the adhesive composition solidifies too quickly, its ability to form a meaningful adhesive bond will be affected. On the other hand, if the adhesive composition solidifies too slowly, there may be insufficient bond strength for further processing steps of the bonded component.

The art recognizes the need for adhesive compositions with reduced solidification time, and which maintain suitable adhesive properties.

SUMMARY

The present disclosure is directed to an adhesive composition comprising a PBPE (propylene based plastomer or elastomer) and optionally a propylene-based polymer wax. The present adhesive composition is particularly suitable for forming a bond between a non-woven fabric and a backsheet made from a polymeric material. In one embodiment, the composition further comprises a propylene-based polymer wax. The propylene-based polymer wax helps to increase the rate of solidification of the composition, and the composition is still able to form a bond during processing.

An advantage of the present adhesive composition is a reduced solidification time with suitable adhesion properties for nonwoven fabric applications.

An advantage of the present adhesive composition is a more rapid solidification during the manufacture process so that the composition can be pelletized and transferred in pellet form.

The present disclosure provides a composition. In an embodiment, an adhesive composition is provided and includes:

A) a propylene based plastomer or elastomer (PBPE) comprising up to 15 wt % units derived from ethylene and having
  (i) a Koenig B-value less than 1.0;
  (ii) a total unsaturation per mole of propylene from 0.010% to 0.030%;
  (iii) a density from 0.860 g/cc to 0.890 g/cc;
  (iv) a melt viscosity at 177° C. from 1,000 mPa·s to 15,000 mPa·s; and
  (v) a weight average molecular weight from 20,000 to 50,000.

BRIEF DESCRIPTION OF THE DRAWINGS

FIG. 1 is a graph showing average 100% modulus and Tc when various components are added to a PBPE, in accordance with embodiments of the present disclosure.

DETAILED DESCRIPTION

The present disclosure provides a composition suitable for adhesive applications.

The adhesive composition includes a propylene-based plastomer or elastomer. And, in one embodiment, includes a propylene-based polymer wax. In an embodiment, the adhesive composition includes the propylene-based plastomer or elastomer, the propylene-based polymer wax, and one, or both, of the following: a tackifier or an oil.

A. Propylene-Based Plastomer or Elastomer

The present adhesive composition includes a propylene based plastomer or elastomer. A "propylene-based plastomer or elastomer" (or "PBPE") is a propylene/ethylene copolymer, and includes at least 50 weight percent of units derived from propylene and up to 15 wt % ethylene comonomer. All individual values and subranges from 1 wt % to 15 wt % are included and disclosed herein. For example, the ethylene content can be from a lower limit of 1, or 3, or 4, or 5, or 6, or 7 wt % to an upper limit of 8, or 9, or 10, or 11, or 12, or 13, or 14, or 15 wt %.

1. PBPE Catalyst

The PBPE is made with a (i) catalyst that is a Group IV metal complex of a polyvalent aryloxyether, (ii) an activator, and/or (iii) a cocatalyst. The catalyst is capable of producing polymers from propylene containing monomer mixtures having extremely high molecular weight and isotacticity, at catalyst efficiencies of greater than 0.5 $g_{polymer}/\mu g_{metal}$, allowing the use of a chain transfer agent to control molecular weight, without sacrificing molecular weight distribution. A sufficient quantity of chain transfer agent is used, so that a substantial decrease in molecular weight (>30 percent) occurs, compared to a comparative polymerization without the use of chain transfer agent. When the chain transfer agent is hydrogen, at least 0.01 mol percent (based on propylene) is used, and a maximum of about 2 mole percent is used. Highly isotactic polymers can be prepared with high levels of chain transfer agents, while still affording narrow molecular weight distribution polymers, and using low levels of alumoxane activators. Generally, use of high levels of chain transfer agent with more conventional catalysts, results in production of polymers having broadened molecular weight distributions. Nonlimiting examples of suitable Group IV metals include titanium, zirconium, and hafnium.

In an embodiment, the Group IV metal complex is a hafnium-based polyvalent aryloxyether.

Nonlimiting examples of suitable Group IV metal complex of a polyvalent aryloxyether include [[2',2'''-[(1R,2R)-1,2-cylcohexanediylbis(methyleneoxy-κO)] bis[3-(9H-carbazol-9-yl)-5-methyl[1,1'-biphenyl]-2-olato-κO]](2-)] dimethyl hafnium; and [[2',2'''-[1,3-propanediylbis(oxy-κO)]bis-{3-[9H-3,6-di-(1,1-dimethylethyl)-carbazol-9-yl]}-5'-fluoro-5-(1,1,3,3-tetramethylbutyl)-[1,1'-biphenyl]-2-olato-κO]](2-)]dimethyl hafnium.

The metal complexes are activated in various ways to yield catalyst compounds having a vacant coordination site that will coordinate, insert, and polymerize addition polymerizable monomers, especially olefin(s). For the purposes of this patent specification and appended claims, the term "activator" or "cocatalyst" means any compound or component or method which can activate the metal complex in the foregoing manner. Non-limiting examples of suitable activators include Lewis acids, non-coordinating ionic activators, ionizing activators, organometallic compounds, and combinations of the foregoing substances capable of converting the neutral metal complex to a catalytically active species.

In an embodiment, catalyst activation may involve formation of a cationic, partially cationic, or zwitterionic species, by means of proton transfer, oxidation, or other suitable activation process. The present invention is operable and fully enabled, regardless of whether or not such an identifiable cationic, partially cationic, or zwitterionic species actually results during the activation process, also known as an "ionization" process or "ionic activation process".

Ionizing cocatalysts may contain an active proton, or some other cation associated with, but not coordinated to, or only loosely coordinated to, an anion of the ionizing compound. Nonlimiting examples include ammonium cation containing salts, especially those containing trihydrocarbyl-substituted ammonium cations containing one or two $C_{10\text{-}40}$alkyl groups, especially methylbis(octadecyl)-ammonium- and methylbis(tetradecyl)-ammonium-cations and a non-coordinating anion, especially a tetrakis(perfluoro)arylborate anion, especially tetrakis(pentafluorophenyl)borate. The cation may comprise a mixture of hydrocarbyl groups of differing lengths. For example, the protonated ammonium cation, derived from the commercially available long-chain amine, comprising a mixture of two $C_{14}$, $C_{16}$ or $C_{18}$ alkyl groups and one methyl group. Such amines are available from Chemtura Corp., under the trade name Kemamine™ T9701, and from Akzo-Nobel under the trade name Armeen™ M2HT. A most preferred ammonium salt activator is methyl di($C_{14\text{-}20}$ alkyl)ammonium tetrakis(pentafluorophenyl)borate.

Another suitable class of organometallic activators or cocatalysts is alumoxanes, also referred to as alkylaluminoxanes. Alumoxanes are well known activators for use with metallocene type catalyst compounds to prepare addition polymerization catalysts. Nonlimiting examples include alumoxanes that are Lewis acid modified alumoxanes, especially tri($C_{3\text{-}6}$)alkylaluminum modified methylalumoxane, including tri(isobutyl)aluminum modified methalumoxane, available commercially as MMAO-3A or tri(n-octyl)aluminum modified methalumoxane, available commercially as MMAO-12, from Akzo Nobel. Inc.

Combinations of activators are also contemplated by the present disclosure, for example, alumoxanes and ionizing activators in combination.

Within the scope of this disclosure is the use of alumoxane(s) or modified alumoxane(s) as an activator or as a tertiary component. That is, the compound may be used alone, or in combination with other activators, either neutral or ionic, such as tri(alkyl)ammonium tetrakis(pentafluorophenyl)borate compounds, tris(perfluoroaryl) compounds, polyhalogenated heteroborane anions, and combinations of two or more of these materials. In this embodiment, the alumoxane may not contribute significantly to actual catalyst activation. Notwithstanding the foregoing, some participation of the alumoxane in the activation process is not necessarily excluded.

Suitable alumoxanes include polymeric or oligomeric alumoxanes, especially methylalumoxane (MAO) as well as Lewis acid-modified alumoxanes, especially trihydrocarbylaluminum-, halogenated tri(hydrocarbyl)aluminum-, or halogenated tri(hydrocarbyl)boron-modified alumoxanes, having from 1 to 10 carbons in each hydrocarbyl or halogenated hydrocarbyl group. Preferred Lewis acid-modified alumoxane compounds are tri(i-butyl)aluminum-modified methalumoxane and tri(n-octyl)aluminum modified methalumoxane containing from 10 to 30, or 15 to 25 mole percent i-butyl content, and 10 to 20, or 12 to 18 mole percent n-octyl content, respectively, the molar percents based on total alkyl ligand content. The alumoxane or Lewis acid-modified alumoxane activator is preferably utilized in molar ratios of cocatalyst:catalyst from 20-200:1, more preferably from 20-150:1, and most preferably from 20-80:1.

Because of the ability to be activated at relatively low levels of alumoxane or Lewis acid-modified alumoxane cocatalysts, while maintaining high catalyst efficiency, the present Group IV metal complexes can achieve reduced levels of cocatalyst by-products in the resulting polymer. This in turn allows the polymers to be employed in demanding applications, such as those requiring high clarity or low dielectric constant.

2. PBPE Properties

The catalyst of Group IV metal complex of a polyvalent aryloxyether imparts unique properties to the PBPE. In one embodiment, the PBPE is characterized as having substantially isotactic propylene sequences. "Substantially isotactic propylene sequences" means the sequences have an isotactic triad (mm) measured by $^{13}C$ NMR of greater than 0.85, or greater than 0.90, or greater than 0.92, or greater than 0.93. Isotactic triads refer to the isotactic sequence in terms of a triad unit in the copolymer molecular chain determined by $^{13}C$ NMR spectroscopy. 3. B-Value (or Koenig B Value)

The PBPE has a B-value less than 1.0 or less than 0.99, or less than 0.98, or less than 0.97. The term "B-value" is a measure of randomness, and measures the distribution of the propylene and ethylene across the polymer chain of the PBPE. B-values range from 0 to 2. The higher the B-value, the more alternating the ethylene distribution in the copolymer. The lower the B-value, the more blocky or clustered the ethylene distribution in the PBPE propylene/ethylene copolymer.

The B-value as described by Koenig (Spectroscopy of Polymers American Chemical Society, Washington, D.C., 1992) is calculated as follows.

B is defined for a propylene/ethylene copolymer as:

$$B = \frac{f(EP + PE)}{2 \cdot F_E \cdot F_P},$$

where f(EP+PE)=the sum of the EP and PE diad fractions; and Fe and Fp=the mole fraction of ethylene and propylene in the copolymer, respectively. The diad fraction can be derived from triad data according to: f(EP+PE)=[EPE]+[EPP+PPE]/2+[PEP]+[EEP+PEE]/2. The B-values can be calculated for other copolymers, in an analogous manner, by assignment of the respective copolymer diads. For example, calculation of the B-value for a propylene/1-octene copolymer uses the following equation:

$$B = \frac{f(OP + PO)}{2 \cdot F_O \cdot F_P}.$$

For PBPE polymers made with a Group IV metal complex of a polyvalent aryloxyether catalyst, the B-values are less than 1.0. In an embodiment, the PBPE has a B-value from 0.90, or 0.92, or 0.93, or 0.94 to 0.95, or 0.96, or 0.97, or 0.98, or 0.99. This means that for PBPE made with the Group IV metal complex of a polyvalent aryloxyether catalyst, not only is the propylene block length relatively long for a given percentage of ethylene, but a substantial amount of long sequences of three or more sequential ethylene insertions are present in the PBPE.

4. Propylene Unsaturation

The PBPE has a total unsaturation, per mole of propylene, from 0.010% to 0.030%. The total unsaturation per mole of propylene is measured by $^1$H NMR analysis as described below.

$^1$H NMR Analysis

Samples are prepared by adding approximately 3.25 g of a 50/50 mixture of tetrachloroethane-d2/perchlorethylene that is 0.0015M in chromium acetylacetonate (relaxation agent) to 0.130 g sample in a 10 mm NMR tube. The samples are dissolved and homogenized by heating the tube and its contents to 110° C. The data is collected using a Bruker 400 MHz spectrometer, equipped with a Bruker Dual DUL high-temperature CryoProbe. The unsaturation data is collected using 4 scans per data file, a 15.6 second pulse repetition delay, with a sample temperature of 120° C. The acquisition is carried out using spectral width of 10,000 Hz and a file size of 16K data points. The presaturation experiment is run with a modified pulse sequence, lc1prf2.zz1 using 100 scans per data file.

Calculations

Moles of H from propylene

Mol fraction propylene $*$ (integral area $\delta\, 3.5 - 0.2$ ppm)

Total moles propylene $$\frac{\text{moles H from propylene}}{6 \text{ protons}}$$

Mol % vinyl unsaturation/mol propylene $$\frac{100 * \text{moles vinyl}}{\text{Total moles propylene}}$$

Mol % Cis/Trans Unsaturation/mol propylene $$\frac{100 * \text{moles cis/trans}}{\text{Total moles propylene}}$$

Mol % trisubstituted unsaturation/mol propylene $$\frac{100 * \text{moles } trisub}{\text{Total moles propylene}}$$

Mol % vinylidene unsaturation/mol propylene $$\frac{100 * \text{moles vinylidene}}{\text{Total moles propylene}}$$

Total mol % unsaturation/mol propylene

Mol % vinyl + Mole cis & trans + Mol % $trisub$ + Mol + vinylidene

The PBPE melt flow rate is too high to be measured. The melt viscosity at 177° C. for the PBPE is from 1000 milliPascal-second (mPa·s), or 2000 mPa·s, or 2500 mPa·s, to 4000 mPa·s, or 7000 mPa·s, or 10,000 mPa·s, or 11,000 mPa·s, or 13,000 mPa·s, or 15,000 mPa·s. In an embodiment, the PBPE has a melt viscosity at 177° C. from 5000 mPa·s to 15,000 mPa·s. In another embodiment, the PBPE has a melt viscosity at 177° C. from 7000 mPa·s to 15,000 mPa·s. In another embodiment, the PBPE has a melt viscosity at 177° C. from 10,000 mPa·s to 15,000 mPa·s.

The PBPE has a crystallinity in the range from 1 wt % to 40 wt %. For example, the crystallinity can be from 10 wt %, to 15, or 20 to 25, or 30, or 35, or 40 wt %. Crystallinity is measured by DSC method, as described below in the test methods section. The propylene/ethylene copolymer includes units derived from propylene and polymeric units derived from ethylene comonomer and optional $C_4$-$C_{10}$ α-olefin. Exemplary comonomers are $C_2$, and $C_4$ to $C_{10}$ α-olefins; for example, $C_2$, $C_4$, $C_6$ and $C_8$ α-olefins.

In one embodiment, the PBPE has a heat of fusion ($H_f$) from 10 J/g to 65 J/g.

In one embodiment, the PBPE has a density from 0.860 g/cc to 0.890 g/cc, or 0.860 g/cc to 0.870 g/cc, or 0.860 g/cc to 0.865 g/cc.

In one embodiment, the PBPE has melting temperature, Tm, from 50° C. to 100° C., or 60° C. to 90° C., or 60° C. to 80° C., or 65° C. to 75° C.

In one embodiment, the PBPE has a weight average molecular weight (Mw) from 20,000 to 50,000 g/mole, further from 24,000 to 50,000 g/mole.

In one embodiment, the PBPE has a Mw/Mn from 2.0 to 4.0, further from 2.0 to 3.5, further from 2.0 to 3.0, further from 2.0 to 2.5.

In an embodiment, the PBPE has one, some, or all of the following properties:
(i) from 80 wt % to 99 wt % units derived from propylene and from 20 wt % to 1 wt % units derived from ethylene;
(ii) an isotactic triad (mm) measured by $^{13}$C NMR greater than 0.92;
(iii) a Koenig B-value from 0.93 to 0.97;
(iv) a total mol % unsaturation propylene from 0.018% to 0.025%, further from 0.019% to 0.025%;
(v) a density from 0.860 g/cc or 0.865 g/cc to 0.870, or 0.875, or 0.880 g/cc;
(vi) a melt viscosity at 177° C. from 6,000 mPa·s to 15,000 mPa·s, further from 7,000 mPa·s to 15,000 mPa·s, further from 8,000 mPa·s to 15,000 mPa·s, further from 10,000 mPa·s to 15,000 mPa·s;
(vii) a melting temperature, Tm from 60° C. to 75° C., further from 60° C. to 72° C., further from 60° C. to 70° C.;
(viii) a heat of fusion ($H_f$) from 40 J/g to 80 J/g;
(ix) a crystallinity from 5% to 15%, further from 5% to 10%;
(x) an Mw from 20,000 to 50,000 g/mole, further from 25,000 to 50,000 g/mole, further from 30,000 to 50,000 g/mole; and
(xi) a Mw/Mn from 2.0 to 3.0, further from 2.0 to 2.7, further from 2.0 to 2.5.

In one embodiment, the PBPE comprises properties (i) through (vii), (ix) and (x), as discussed above.

In one embodiment, the PBPE comprises properties (i), (iii) through (vii), (ix) and (x), as discussed above.

The PBPE is present in the adhesive composition in an amount from 10 wt %, or 20 wt %, or 30 wt %, or 35 wt %, or 40 wt %, or 45 wt %, or 50 wt %, or 55 wt %, or 60 wt % to 70 wt %, or 75 wt %, or 80 wt %, or 85 wt %, or 89 wt %, or 90 wt %, or 95 wt %, or 97 wt %, or 99 wt %. In an embodiment, the PBPE is present in the adhesive composition in an amount from 80 wt %, or 85 wt %, or 90 wt % to 95 wt %, or 97 wt %, or 99 wt %. Weight percent is based on total weight of the adhesive composition.

The PBPE may comprise two or more embodiments disclosed herein.

5. Propylene-Based Polymer Wax

In an embodiment, the present adhesive composition includes a propylene-based polymer wax.

A "propylene-based polymer wax," as used herein, is a wax composed of a propylene-based polymer comprising a majority amount of polymerized propylene monomer (based on the weight of the polymer), and optionally an α-olefin comonomer other than propylene, or ethylene.

The propylene-based polymer wax can be a propylene/α-olefin copolymer wax, a propylene/ethylene copolymer wax, or a propylene homopolymer wax. In an embodiment, the propylene-based polymer wax is a propylene homopolymer wax. In a further embodiment, the propylene homopolymer wax is produced by way of Ziegler-Natta catalyst polymerization or metallocene catalyst polymerization, yielding a Ziegler-Natta catalyzed propylene-based polymer wax or a metallocene-catalyzed propylene-based polymer wax, respectively.

In an embodiment, the propylene-based polymer wax is a propylene homopolymer wax and excludes functionalized wax, polyethylene wax, Fischer-Tropsch wax, animal wax, plant wax, petroleum-derived wax (paraffin wax, microcrystalline wax), and montan wax.

In an embodiment, the propylene-based polymer wax is a propylene homopolymer wax and has, one, some, or all of the following properties:
 (i) a density from 0.89 g/cc, or 0.90 g/cc to 0.91 g/cc; and
 (ii) a melt viscosity (at 170° C.) from 50 mPa·s, or 55 mPa·s to 60 mPa·s, or 65 mPa·s, or 70 mPa·s.

In one embodiment, the propylene based polymer wax is a propylene/α-olefin copolymer wax.

In one embodiment, the propylene based polymer is a propylene/ethylene copolymer wax.

Nonlimiting examples of suitable propylene-based polymer waxes are waxes sold under the tradename LICOCENE, available from Clariant.

In one embodiment, the propylene-based polymer wax is present in the adhesive composition in an amount from 1 wt %, or 5 wt %, or, 10 wt %, to 15 wt %, or 20 wt %. Weight percent is based on total weight of the adhesive composition.

In an embodiment, the adhesive composition contains from 80 wt %, or 85 wt %, to 90 wt %, or 95 wt % of the PBPE, and from 20 wt % or 15 wt %, to 10 wt %, or 5 wt % of the propylene-based polymer wax, and adhesive composition has one, some, or all of the following properties:
 (i) a crystallization temperature (Tc) from 55° C. to 90° C.;
 (ii) a secant modulus (100%) from 6.5 kPa to 40 kPa;
 (iii) a melt viscosity at 150° C. from 1,000 mPa·s to 20,000 mPa·s; and
 (iv) a Tc from 20° C. to 65° C. when cooled at a rate of 40° C./min to 200° C./min.

The propylene-based polymer wax may comprise a combination of two or more embodiments disclosed herein.

6. Tackifier

The present adhesive composition optionally includes a tackifier.

In an embodiment, the present adhesive composition includes a tackifier. Tackifiers suitable for the compositions disclosed herein can be solids, semi-solids, or liquids at room temperature. Non-limiting examples of tackifiers include (1) natural and modified rosins (e.g., gum rosin, wood rosin, tall oil rosin, distilled rosin, hydrogenated rosin, dimerized rosin, and polymerized rosin); (2) glycerol and pentaerythritol esters of natural and modified rosins (e.g., the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin); (3) copolymers and terpolymers of natured terpenes (e.g., styrene/terpene and alpha methyl styrene/terpene); (4) polyterpene resins and hydrogenated polyterpene resins; (5) phenolic modified terpene resins and hydrogenated derivatives thereof (e.g., the resin product resulting from the condensation, in an acidic medium, of a bicyclic terpene and a phenol); (6) aliphatic or cycloaliphatic hydrocarbon resins and the hydrogenated derivatives thereof (e.g., resins resulting from the polymerization of monomers consisting primarily of olefins and diolefins); (7) aromatic hydrocarbon resins and the hydrogenated derivatives thereof; (8) aromatic modified aliphatic or cycloaliphatic hydrocarbon resins and the hydrogenated derivatives thereof; and combinations thereof.

In an embodiment, the tackifier is a hydrogenated cyclic hydrocarbon resin (e.g., REGALREZ™ and REGALITE™ resins from Eastman Chemical Company).

In one embodiment, the tackifier is present in the adhesive composition in an amount from 5 wt %, or 10 wt %, or 15 wt %, or, 20 wt %, to 25 wt %, or 30 wt %, or 35 wt %. Weight percent is based on total weight of the adhesive composition.

The tackfier may comprise a combination of two or more embodiments disclosed herein.

7. Oil

The present adhesive composition optionally includes an oil.

In an embodiment, the present adhesive composition includes an oil. Nonlimiting examples of suitable oil include aromatic oil, mineral oil, napththenic oil, paraffinic oil, a triglyceride-based vegetable oil such as castor oil, a synthetic hydrocarbon oil such as polypropylene oil, a silicone oil, or any combination thereof.

In an embodiment, the oil is a paraffinic oil (e.g., Catenex® T145 available from Shell).

In one embodiment, the oil is present in the adhesive composition in an amount from 5 wt %, or 10 wt %, or 15 wt %, or, 20 wt %, to 25 wt %, or 30 wt %, or 35 wt %. Weight percent is based on total weight of the adhesive composition.

The oil may comprise a combination of two or more embodiments disclosed herein.

In an embodiment, the adhesive composition contains:
 (a) from 40 wt %, or 50 wt %, or 55 wt %, to 70 wt %, or 75 wt %, or 80 wt %, or 85 wt %, or 89 wt %, or 90 wt %, or 95 wt %, or 99 wt %, or 100 wt % of the PBPE;
 (b) optionally, from 1 wt %, or 3 wt %, or 5 wt % to 10 wt % or 15 wt % of the propylene-based polymer wax;
 (c) optionally, from 15 wt %, or, 20 wt %, to 25 wt %, or 30 wt %, or 35 wt % of the tackifier; and
 (d) optionally, from 5 wt %, or 10 wt %, or 15 wt % to 20 wt %, or 25 wt % of the oil, and the adhesive composition has one, some, or all of the following properties:
 (i) a crystallization temperature (Tc) from 55° C. to 90° C.;
 (ii) a secant modulus (100%) from 6.5 kPa to 40 kPa;
 (iii) a melt viscosity at 150° C. from 1,000 mPa·s to 20,000 mPa·s; and
 (iv) a Tc from 20° C. to 65° C. when cooled at a rate of 40° C./min to 200° C./min.

8. Additive

The present adhesive composition may include one or more additives.

Additives include, but are not limited to, oxidized polyolefins, maleated polyolefins, UV stabilizers, plasticizers, antioxidants, thickeners, dyes/pigments and inorganic fillers.

The present additive may comprise a combination of two or more embodiments disclosed herein.

9. Article

The present disclosure provides an article. The article includes at least one component formed from the present adhesive composition. The adhesive composition can be any adhesive composition as disclosed above. Nonlimiting examples of suitable articles include articles including a nonwoven fabric adhered to an olefin-based polymer backsheet, such as diapers and feminine hygiene products.

In an embodiment, that article includes a substrate. The adhesive composition is on at least one surface of the substrate.

In an embodiment, the adhesive composition forms a seal between the at least one surface of the substrate and at least one surface of another substrate.

In an embodiment, at least one substrate is a non-woven fabric. As used herein a "nonwoven fabric" is an assembly of monocomponent and/or bicomponent fibers (for example, core/sheath, islands in the sea, side-by side, segmented pie etc.) held together in a random web, such as by mechanical interlocking, or by fusing at least a portion of the fibers. The following descriptions provide nonlimiting procedures for producing nonwoven fabric. Fibers produced by melt spinning processes that include staple fiber spinning (including short spinning, long spinning), Spunbond, melt blown, or multiple combinations thereof, can be formed into a web, which is thereafter formed into a nonwoven fabric using binding technologies, such as carded thermal bonding, wet-laid, airlaid, airthrough bonding, calendar thermal bonding, hydro entanglement, needlepunching, adhesive bonding or any combinations thereof.

In an embodiment, the present adhesive composition forms a seal between a substrate that is a nonwoven fabric, and another substrate that is a back-sheet. The back-sheet is a sheet formed from a composition comprising an olefin-based polymer, and further comprising a majority amount of the olefin-based polymer, based on the weight of the composition.

In an embodiment, the article having at least one component formed from the present adhesive composition exhibits an initial peel force equal to or greater than 1 N/25 mm, or from 1 N/25 mm, or 1.5 N/25 mm, or 2 N/25 mm, or 2.5 N/25 mm to 3.0 N/25 mm, or 3.5 N/25 mm, or 4.0 N/25 mm, or 4.5 N/25 mm, or 5.0 N/25 mm, or 5.5 N/25 mm, as measured in accordance with ISO 11339 (180° peel test configuration, clamp separation speed of 300 mm/min).

In an embodiment, the article having at least one component formed from the present adhesive composition exhibits a peel force after aging 14 days at 40° C. equal to or greater than 1 N/25 mm, or from 1 N/25 mm, or 1.5 N/25 mm, or 2 N/25 mm, or 2.5 N/25 mm to 3.0 N/25 mm, or 3.5 N/25 mm, or 4.0 N/25 mm, or 4.5 N/25 mm, or 5.0 N/25 mm, or 5.5 N/25 mm, as measured in accordance with ISO 11339 (180° peel test configuration, clamp separation speed of 300 mm/min).

The present adhesive composition may comprise two or more embodiments disclosed herein. In one embodiment, the adhesive composition is a hot melt adhesive composition.

An inventive article may comprise a combination of two or more embodiments disclosed herein.

The demand for adhesive compositions with lower viscosity is increasing. A growing number of adhesive applications require the polymer component to have ultralow weight average molecular weight (Mw 50,000 or less) and narrow molecular weight distribution (Mw/Mn from 2.0 to 4.0). However, ultralow molecular weight olefin-based polymer typically has very low melt viscosity (typically less than 20,000 mPa·s or lower at 177° C.), making commercial-scale production (5 metric tons/hr) difficult due to the impediments of handling and processing such low viscosity material.

Applicant discovered that homogenization can be used to prepare low viscosity adhesive compositions. As used herein, "homogenization" is a process that reduces the viscosity of a material.

The present disclosure includes a process for homogenizing one or more olefin-based polymers. The term, "olefin-based polymer," as used herein, refers to a polymer that comprises, in polymerized form, a majority amount of olefin monomer, for example ethylene or propylene (based on the weight of the polymer), and optionally may comprise one or more comonomers. The olefin-based polymer can be any olefin-based polymer components disclosed above, such as the PBPE disclosed herein, for example. Although the following disclosure is directed to olefin-based polymer, it is understood that the homogenization process can be applied to any individual adhesive component, as well as to the final adhesive composition (such as a hot melt adhesive composition, for example). The present homogenization process advantageously reduces the viscosity of the polymer component of the adhesive composition mechanically, avoiding chemical viscosity reduction, such as visbreaking for example.

The process includes subjecting the olefin-based polymer or the adhesive composition to homogenization, and reducing the melt viscosity of the olefin-based polymer or the adhesive composition. In a further embodiment, the process includes reducing the melt viscosity of the olefin-based polymer or the adhesive composition from 10% to 40% of its initial viscosity prior to the homogenization.

In an embodiment, the homogenization step includes subjecting the olefin-based polymer (or adhesive composition) to high pressure homogenization. High pressure homogenization utilizes a high pressure homogenizer. A "high pressure homogenizer," (or HPH) as used herein, is a device that applies at least 100 bar hydrostatic pressure to a fluid substance and subsequently imposes a restricted flow to the fluid.

HPH includes placing the olefin-based polymer (or adhesive composition) in a melt state (polymer melt) or in an otherwise flowable state. A pressure pump delivers the polymer melt to a valve area of the HPH under high pressure, typically from 100 bar to 2000 bar. In the valve area, a homogenization gap is present between a valve seat and a valve. The homogenization gap is a minute space between the valve seat and the valve. As the polymer melt flows through and exits the homogenization gap, a rapid increase in velocity occurs simultaneously with a rapid decrease in pressure. The intense energy, release at the homogenization gap, causes turbulence and localized pressure, breaking the individual chains of the olefin-based polymer. An impact ring may or may not be directly downstream the homogenization gap. Impingement of the polymer melt with the impact ring imparts further turbulence to the polymer melt exiting the homogenization gap. Bounded by no particular theory, it is believed one, some, or all of the following phenomena occur in the HPH and contribute to the viscosity reduction of the polymer melt (adhesive melt): high hydrostatic pressure, shear stress, cavitation, turbulence, impingement, and temperature increase.

In an embodiment, the HPH reduces the melt viscosity of the olefin-based polymer (or adhesive composition) from 10%, or 15%, or 20%, or 25% to 30% or 35% or 40%. The reduction in melt viscosity is based on the initial melt viscosity of the olefin-based polymer (or adhesive composition) prior to homogenization. The reduced-viscosity polymer melt continues through a channel of the HPH for movement to the next processing stage.

In an embodiment, the HPH is a two-stage high pressure homogenizer. The first-stage includes the pressure pump and valve area as described above. The second stage includes a second pressure pump and a second valve area that utilizes from 10% to 20% less pressure than the first stage in order to reduce cavitation and increase turbulent flow.

In an embodiment, the process includes introducing an olefin-based polymer having a melt viscosity from 1,000 mPa·s to 15,000 mPa·s (at 177° C.), further from 1,500 mPa·s to 15,000 mPa·s, and further from 1,500 mPa·s to 12,000 mPa·s, into a high pressure homogenizer. The process includes subjecting the olefin-based polymer to high pressure homogenization and forming an olefin-based polymer with a melt viscosity from 1,000 mPa·s to 15,000 mPa·s (at 177° C.), further from 1,500 mPa·s to 15,000 mPa·s, and further from 1,500 mPa·s to 12,000 mPa·s.

In an embodiment, the process includes introducing an adhesive composition having a melt viscosity from 1,000 mPa·s to 20,000 mPa·s (at 150° C.), further from 1,500 mPa·s to 20,000 mPa·s, further from 1,500 mPa·s to 15,000 mPa·s, and further from 1,500 mPa·s to 12,000 mPa·s, into a high pressure homogenizer. The process includes subjecting the adhesive composition to high pressure homogenization and forming an adhesive composition having a melt viscosity from 1,000 mPa·s to 20,000 mPa·s (at 150° C.), further from 1,500 mPa·s to 20,000 mPa·s, further from 1,500 mPa·s to 15,000 mPa·s, and further from 1,500 mPa·s to 12,000 mPa·s.

In an embodiment, the process includes introducing a formulated adhesive composition having a melt viscosity from 800 mPa·s to 3,500 mPa·s, further from 1,000 mPa·s to 3,500 mP·s (at 150° C.), into a high pressure homogenizer. The process includes subjecting the formulated adhesive composition to high pressure homogenization and forming an adhesive composition having a melt viscosity from 480 mPa·s to 2,100 mPa·s, further from 1,000 mPa·s to 2,100 mPa·s (at 150° C.).

The homogenization process may comprise two or more embodiments disclosed herein.

Definitions

The numerical ranges disclosed herein include all values from, and including, the lower value and the upper value. For ranges containing explicit values (e.g., 1 or 2, or 3 to 5, or 6, or 7) any subrange between any two explicit values is included (e.g., 1 to 2; 2 to 6; 5 to 7; 3 to 7; 5 to 6; etc.).

Unless stated to the contrary, implicit from the context, or customary in the art, all parts and percents are based on weight, and all test methods are current as of the filing date of this disclosure.

The term "composition," as used herein, refers to a mixture of materials which comprise the composition, as well as reaction products and decomposition products formed from the materials of the composition.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. The term polymer includes trace amounts of impurities, for example catalyst residue, that may be incorporated into and/or within the polymer.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

Test Methods

Melt Index

Melt flow rate (MFR) is measured in accordance with ASTM D-1238 (230° C.; 2.16 kg). The result is reported in grams/10 minutes.

Density

Density is measured in accordance with ASTM D-792. The result is reported in grams (g) per cubic centimeter, or g/cc.

Gel Permeation Chromatography (GPC)

A high temperature gel permeation chromatography (GPC) system, equipped with Robotic Assistant Deliver (RAD) system for sample preparation and sample injection. The concentration detector is an Infra-red detector (IR4) from Polymer Char Inc (Valencia, Spain). Data collection was performed using Polymer Char DM 100 Data acquisition box. The carrier solvent was 1,2,4-trichlorobenzene (TCB). The system was equipped with an on-line solvent degas device from Agilent. The column compartment was operated at 150° C. The columns were four Mixed A LS 30 cm, 20 micron columns. The solvent was nitrogen purged 1,2,4-trichlorobenzene (TCB) containing approximately 200 ppm 2,6-di-t-butyl-4-methylphenol (BHT). The flow rate is 1.0 mL/min, and the injection volume was 200 μl. A 2 mg/mL sample concentration was prepared by dissolving the sample in $N_2$ purged and preheated TCB (containing 200 ppm BHT), for 2.5 hrs at 160° C. with gentle agitation.

The GPC column set was calibrated by running twenty narrow molecular weight distribution polystyrene standards. The molecular weight (MW) of the standards ranges from 580 to 8,400,000 g/mol, and the standards were contained in six "cocktail" mixtures. Each standard mixture had at least a decade of separation between individual molecular weights. The equivalent polypropylene molecular weights of each PS standard were calculated by using following equation, with reported Mark-Houwink coefficients for polypropylene (Th.G. Scholte, N. L. J. Meijerink, H. M. Schoffeleers, and A. M. G. Brands, J. Appl. Polym. Sci., 29, 3763-3782 (1984)) and polystyrene (E. P. Otocka, R. J. Roe, N. Y. Hellman, P. M. Muglia, Macromolecules, 4, 507 (1971)):

$$M_{PP} = \left(\frac{K_{PS} M_{PS}^{a_{PS}+1}}{K_{PP}}\right)^{\frac{1}{a_{PP}+1}},$$

where $M_{PP}$ is PP equivalent MW, $M_{PS}$ is PS equivalent MW, log K and a values of Mark-Houwink coefficients for PP and PS are listed below.

| Polymer | a | log K |
|---|---|---|
| Polypropylene | 0.725 | −3.721 |
| Polystyrene | 0.702 | −3.900 |

A logarithmic molecular weight calibration was generated using a fourth order polynomial fit as a function of elution volume. Number average and weight average molecular weights were calculated according to the following equations:

$$M_n = \frac{\sum^i Wf_i}{\sum^i (Wf_i/M_i)}, \quad (2)$$

$$M_w = \frac{\sum^i (Wf_i * M_i)}{\sum^i (Wf_i)}, \quad (3)$$

where $Wf_i$ and $M_i$ are the weight fraction and molecular weight of elution component i, respectively.

Differential Scanning Calorimetry (DSC)

Differential Scanning calorimetry (DSC) is used to measure crystallinity in the polymers (e.g., ethylene-based (PE) polymers, or propylene-based (PP) polymers). About 5 to 8 mg of polymer sample is weighed and placed in a DSC pan. The lid is crimped on the pan to ensure a closed atmosphere. The sample pan is placed in a DSC cell, and then heated, at a rate of approximately 10° C./min, to a temperature of 180° C. for PE (230° C. for polypropylene or "PP"). The sample is kept at this temperature for three minutes. Then the sample is cooled at a rate of 10° C./min to −60° C. for PE (−40° C. for PP), and kept isothermally at that temperature for three minutes. The sample is next heated at a rate of 10° C./min, until complete melting (second heat). The percent crystallinity is calculated by dividing the heat of fusion ($H_f$), determined from the second heat curve, by a theoretical heat of fusion of 292 J/g for PE (165 J/g, for PP), and multiplying this quantity by 100 (for example, % cryst.=($H_f$/292 J/g)× 100 (for PE)).

Unless otherwise stated, melting point(s) ($T_m$) of each polymer is determined from the second heat curve (peak Tm), and the crystallization temperature ($T_c$) is determined from the first cooling curve (peak Tc).

Melt viscosity is measured using a Brookfield Viscometer Model, and a Brookfield RV-DV-II-Pro viscometer spindle 31 at 177° C. for the PBPE, at 170° C. for the propylene-based polymer wax and at 150° C. for the adhesive composition. The sample is poured into the chamber, which is, in turn, inserted into a Brookfield Thermosel, and locked into place. The sample chamber has a notch on the bottom that fits the bottom of the Brookfield Thermosel, to ensure that the chamber is not allowed to turn, when the spindle is inserted and spinning. The sample (approximately 8-10 grams of resin) is heated to the required temperature, until the melted sample is about one inch below the top of the sample chamber. The viscometer apparatus is lowered, and the spindle submerged into the sample chamber. Lowering is continued, until the brackets on the viscometer align on the Thermosel. The viscometer is turned on, and set to operate at a shear rate, which leads to a torque reading in the range of 40 to 60 percent of the total torque capacity, based on the rpm output of the viscometer. Readings are taken every minute for about 15 minutes, or until the values stabilize, at which point, a final reading is recorded. Results are provided in milliPascal-second (mPa·s).

Modulus of Elasticity

Modulus of elasticity is measured in accordance with ASTM D 1708.

$^{13}$C NMR experimental procedure for propylene-ethylene copolymers

$^{13}$C NMR is used for ethylene content, Koenig B-value, triad distribution, and triad tacticity and is performed as follows:

Sample Preparation (Propylene-Ethylene Copolymers)

The samples are prepared by adding approximately 2.7 g of a 50/50 mixture of tetrachloroethane-$d_2$/orthodichlorobenzene containing 0.025 M Cr(AcAc)$_3$ to 0.20-0.30 g sample in a Norell 1001-7 10 mm NMR tube. The samples are dissolved and homogenized by heating the tube and its contents to 150° C., using a heating block and heat gun. Each sample is visually inspected to ensure homogeneity.

Data Acquisition Parameters (Propylene-Ethylene Copolymers)

The data are collected using a Bruker 400 MHz spectrometer, equipped with a Bruker Dual DUL high-temperature CryoProbe. The data are acquired using 320 transients per data file, a 6 sec pulse repetition delay, 90 degree flip angles, and inverse gated decoupling with a sample temperature of 120° C. All measurements are made on non-spinning samples in locked mode. Samples are allowed to thermally equilibrate for 7 minutes prior to data acquisition. Percent mm tacticity and wt % ethylene is then determined according to methods commonly used in the art.*

*REFERENCES

For composition (wt % E):
  S. Di Martino and M. Kelchtermans; J. Appl. Polym. Sci., V 56, 1781-1787 (1995)
Tacticity, detailed assignments:
  V. Busico, R. Cipullo; Prog. Polym. Sci. V 26, 443-533 (2001)
The "Koenig B-value" or chi statistic is one measure of randomness or blockiness in a propylene ethylene random copolymer. A value of 1.0 indicates a random copolymer and a value of zero indicates complete blocks of monomers A and B. A B-value of 2 indicates an alternating copolymer. B=[EP]/(2[P][E]), where [EP] is the total mole fraction of EP dimers (EP+PE, or (EEP+PPE+PEP+EPE)), and [E] is the mole fraction ethylene, and [P]=1−[E]. Koenig, Jack L.; Spectroscopy of Polymers, 2nd ed.

Softening Point

Ring-and-ball softening point is measured using a Mettler Toledo FP900 Thermosystem according to ASTM E28.

180° Peel Test

A. Laminate Production

Non-woven/back-sheet laminates are prepared using Nordson/JHT lab coater. Melting tank, transfer hose and melt applicators were all set at 150° C. Adhesive add-on weights were 2, 3 and 5 gsm (grams/square meter). The melt pump rpm is kept constant at 27 rpm, and line speed was typically 23, 16 and 10 m/min to give the required coating weights. Lamination pressure is set at 1.5 bar. The slot coating die opening is perpendicular to the substrate, and positioned 4 cm below the mid-point of the rubber roll. The die is brought into contact with the substrate, giving a deflection of around 2 mm. A 12 gsm hydrophobic polypropylene non-woven substrate from Fitesa is used, along with a 16 gsm breathable back-sheet from Clopay MicroPro FPS K-16M. Application is onto the non-woven substrate. The final laminate configuration was: non-woven (12 gsm)/adhesive composition/breathable back sheet (16 gsm). During the preparation of the laminate, a strip of silicone release liner was introduced perpendicular to the machine direction in the lamination process in order to have an area free of adhesive to facilitate opening of the laminate in the determination of peel force.

B. Laminate Adhesion Testing

The non-woven (12 gsm)/adhesive composition/breathable back sheet (16 gsm) laminate with the silicone release liner was cut in machine direction into 25 mm×150 mm strips (test samples), having a bond area of 25 mm×120 mm and a non-bonded area of 25 mm×30 mm (where the silicone release liner was present). The laminate was opened at the end containing the silicone release liner and these non-bonded ends of each strip were inserted into the opposing clamps of a Zwick Z010 Tensile Tester equipped with a 100N load cell. Average peel force was determined in accordance with ISO 11339 using a 180° peel test configuration and a clamp separation speed of 300 mm/min. Seven laminates samples were tested for each condition to give an average peel force. Results are provided in Newtons (N) per 25 millimeter (mm).

C. Laminate Aging

Initial adhesion measurements (typically 48 hours after production of the laminate) and adhesion after aging (2 weeks at 40° C.) are reported. Aging is carried out on "20 mm×150 mm" pre-cut samples.

Some embodiments of the present disclosure will now be described in detail in the following Examples.

EXAMPLES

1. Preparation of PBPE

Two PBPEs are produced utilizing a hafnium metal complex of a polyvalent aryloxyether catalyst.

Catalyst B is a hafnium metal complex of a polyvalent aryloxyether catalyst that is [[2',2'''-[1,3-propanediylbis(oxy-κO)]bis-{3-[9H-3,6-di-(1,1-dimethylethyl)-carbazol-9-yl}-5'-fluoro-5-(1,1,3,3-tetramethylbutyl)-[1,1'-biphenyl]-2-olato-κO]](2-)]dimethyl hafnium.

Table 1 below provides the name and structure for Catalyst B.

Each PBPE is made according to the following procedure. Catalyst B and cocatalyst component solutions are metered, using pumps and mass flow meters, and are combined with the catalyst flush solvent, and introduced into the bottom of the reactor. The cocatalyst used, is a long-chain alkyl ammonium borate of approximate stoichiometry equal to methyl di(octadecyl)ammonium tetrakis(pentafluorophenyl)borate (MDB), combined with a tertiary component, tri(isobutyl) aluminum modified methalumoxane (MMAO) containing a molar ratio of i-butyl/methyl groups of about ⅓. For Catalyst B, the cocatalyst is in a molar ratio based on Hf of 1.2/1, and MMAO (25/1 Al/Hf).

The polymerization process is exothermic. About 900 British thermal units (BTUs) are released per pound (2009 kJ/kg) of propylene polymerized, and about 1,500 BTUs released per pound (3489 kJ/kg) of ethylene polymerized. The primary process design consideration is the removal of the heat of reaction. The propylene-ethylene (P-E) copolymers are produced in a low-pressure, solution polymerization loop reactor, made up of a 3 inch (76 mm) loop pipe plus two heat exchanges, the total volume of which is 31.4 gallons (118.9 liter). Solvent and monomer (propylene) are injected into the reactor as a liquid. The comonomer (ethylene) gas is fully dissolved in the liquid solvent. The feed is cooled to 5° C. before injection into the reactor. The reactor operates at polymer concentration from 15 wt % to 20 wt %. The adiabatic temperature rise of the solution accounts for some of the heat removal from the polymerization reaction. Heat exchangers within the reactor are utilized to remove the remaining heat of reaction, allowing for reactor temperature control at the reaction temperatures.

The solvent used is a high purity iso-paraffinic fraction, available from Exxon under the trademark Isopar E. Fresh propylene is passed through a bed of Selexsorb COS for purification, before mixing with a recycle stream containing solvent, propylene, ethylene, and hydrogen. After mixing with the recycle stream, the combined stream is passed through a bed of 75 wt % Molecular Sieve 13× and 25 wt %

TABLE 1

Hafnium Metal Complex of a Polyvalent Aryloxyether Catalyst
Catalyst B

[[2',2'''-[1,3-propanediylbis(oxy-κO)]bis-{3-[9H-3,6-di-(1,1-dimethylethyl)-carbazol-9-yl]}-5'-fluoro-5-(1,1,3,3-tetramethylbutyl)-[1,1'-biphenyl]-2-olato-κO]](2-)]dimethyl hafnium

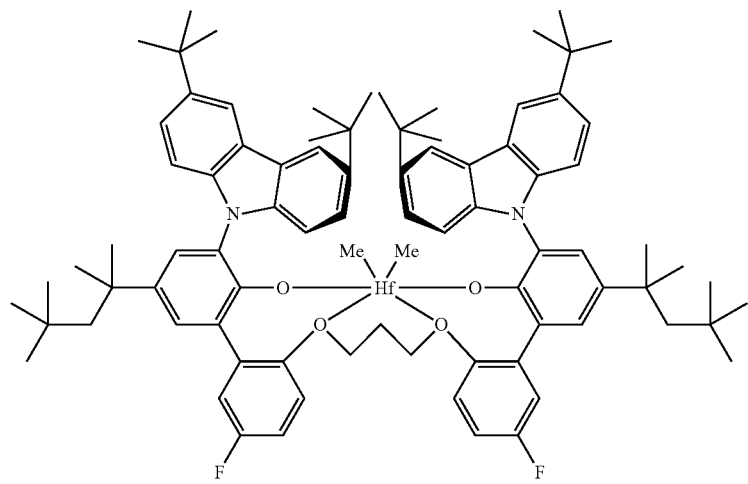

Selexsorb CD, for further purification, before using a high pressure 700 psig (4826 kPa) feed pump to pass the contents to the reactor. Fresh ethylene is passed through a Selexsorb COS bed for purification, before compressing the stream to 750 psig (5171 kPa). Hydrogen (a telogen used to reduce molecular weight) is mixed with the compressed ethylene, before the two are mixed/dissolved into the liquid feed. The total stream is cooled to an appropriate feed temperature (5° C.). The reactor operates at 500-525 prig (3447-3619 kPa). The propylene conversion in the reactor is maintained by controlling the catalyst injection rate. The reaction temperature is maintained by controlling the water temperature across the shell side of the heat exchanger at 85° C. The residence time in the reactor is short (about 10 minutes).

Upon exiting the reactor, water and additive are injected into the polymer solution. The water hydrolyzes the catalyst, terminating the polymerization reaction. The additives consist of antioxidants, i.e., 500 ppm of a phenolic and 1000 ppm of a phosphite, which remain with the polymer, and act as stabilizers, to prevent polymer degradation while in storage, before subsequent fabrication at an end-user's facility. The post-reactor solution is super-heated from reactor temperature to 230° C., in preparation for a two-stage devolatilization. The solvent and unreacted monomers are removed during the devolatilization process. The polymer melt is pumped to a die for underwater pellet cutting.

Solvent and monomer vapors, exiting the top of the devolatilizers, are sent to a coalescer. The coalescer removes polymer entrained in the vapor during devolatilization. The clean vapor stream, leaving the coalesce, is partially condensed through a series of heat exchangers. The two-phase mixture enters a separation drum. The condensed solvent and monomers are purified (this is the recycle stream described above) and re-used in the reaction process. The vapors leaving the separating drum, mostly containing propylene and ethylene are sent to a block flare and burned.

The properties for PBPEs produced by the foregoing process are provided in Table 2 below.

TABLE 3-continued

Starting Materials for Adhesive Compositions

| Component | Specification | Source |
|---|---|---|
| Licocene 6102 (PP wax) | wax - metallocene-catalyzed propylene-based polymer wax, white fine grain | Clariant |
| | crystallization temp 94.2° C. | |
| | drop point 145° C. | |
| | viscosity at 170° C. 60 mPa · s | |
| | density 0.90 g/cc | |
| | acid value 0 mg KOH/g | |
| Irganox ® 1010 | Antioxidant pentaerythritol tetrakis(3-(3,5-di-tert-butyl-4-hydroxyphenyl)propionate) CAS 6683-19-8 | BASF |
| | Density 1.15 g/cc | |
| | Flashpoint 297° C. | |
| Regalite ® R1090 | tackifier - hydrocarbon resin | Eastman |
| Catenex ® T145 | paraffinic process oil | Shell |

3. Production of Adhesive Compositions

The materials are weighed on a Mettler-Toledo AT201 model lab balance in the proportions shown in Table 4 below. In order to achieve a uniform dispersion and distribution of the formulations, a Haake drive model rs5000 rheometer, equipped with a small bowl (approximately 50 g capacity), is used. The bowl is heated to 150° C., and mixed at 70 RPM for 5 minutes. Irganox 1010 is added after all of the solid materials have achieved a melted state.

The adhesive compositions are translucent and clear in their melted state. After being removed from the bowl, the samples are allowed to solidify on a sheet of Teflon coated paper, which takes approximately 10 minutes for each sample. Samples remain somewhat translucent after complete solidification, and maintain similar elastic characteristics to the low density base material used.

TABLE 2

Properties for PBPE

| PBPE | Catalyst | Wt % C2* | Density | Melt Viscosity at 177° C. (mPa · s) | Tm (° C.) | % Cryst | Mn | Mw | Mw/Mn | B-value | total mole % unsat/mol propylene | Isotact (% mm) |
|---|---|---|---|---|---|---|---|---|---|---|---|---|
| PBPE1 | B | 12.6 | 0.864 | 11300 | 66.90 | 9.70 | 21,443 | 48,380 | 2.26 | 0.95 | 0.021 | 93.0 |
| PBPE2 | B | 6.7 | 0.8823 | 9058 | 99.70 | 32.0 | 13,500 | 45,742 | 3.39 | 0.92 | 0.0167 | 93.3 |
| PBPE3 | B | 12.1 | 0.864 | 7750 | 71 | 13 | 16760 | 37788 | 2.25 | 0.95 | 0.0179 | 95.6 |

*wt % C3 present in PBPE = 100 − (wt % C2)

2. Adhesive Compositions

Materials used to produce hot melt adhesive compositions are provided in Table 3 below.

TABLE 3

Starting Materials for Adhesive Compositions

| Component | Specification | Source |
|---|---|---|
| PBPE | See above | The Dow Chemical Company |

TABLE 4

| | | | Adhesive Compositions in Weight Parts | | | |
|---|---|---|---|---|---|---|
| FORMULATION Label | PBPE1 P/E | PBPE2 HD-P/E | Licocene 6102 PP Wax | Irganox | Tc (std DSC) (° C.) | 100% Modulus (psi/kPa) |
| 100/0 | 100.0 | | | 0.5 | 26.3 | 3.8/2633 |
| 95/5 | 95.0 | 5.0 | | 0.5 | 37.6 | 4.0/2738 |
| 90/10 | 90.0 | 10.0 | | 0.5 | 44.9 | 4.3/2942 |
| 80/20 | 80.0 | 20.0 | | 0.5 | 53.1 | 4.9/3397 |
| 95/5 | 95.0 | 0.0 | 5.0 | 0.5 | 66.1 | 4.0/2754 |
| 90/10 | 90.0 | 0.0 | 10.0 | 0.5 | 75.9 | 4.0/2750 |
| 80/20 | 80.0 | 0.0 | 20.0 | 0.5 | 86.5 | 4.3/2983 |

In Table 4 above, 100% modulus is calculated from microtensile testing results, which are obtained according to ASTM method D-1708. Samples are compression molded into a 125 mil chase, using a Carver press at 190° C. (low pressure (140 kPa for 6 minutes), high pressure (1400 kPa for 6 minutes)), and a cool down under 1400 kPa, at 15° C./min, to 40° C. An appropriate die was used with a Naef punch press to cut out samples (micro-tensile bars) from these plaques (thickness=125 mil) to obtain specimens for microtensile testing (5 inches/minute strain rate). Five to six specimens are tested per sample. 100% modulus is reported in kiloPascal (kPa).

FIG. 1 shows the results of adding PBPE2 ("P/E" in FIG. 1) or Licocene 6102 ("PP wax" in FIG. 1) to PBPE1. Table 4 and FIG. 1 show that addition of Licocene 6102 to PBPE1 maintains and slightly improves the 100% modulus of the present composition, and also increases the Tc of the present composition for improved processability.

4. High Cooling Rate Tests
High Cooling Rate DSC Results

Two blends are selected for "high cooling rate DSC" testing, which provides crystallization information more applicable to the conditions that materials would experience during the pelletization process.

A. Standard Differential Scanning Calorimetry (DSC)

A small sample of each formulation (approximately 1 g) is quickly compression molded into a thin film using a Carver press at 190° C. (1200 kPa, 10 seconds). Each thin film sample has a circular section cored, and is weighed on a Mettler-Toledo AT201 model lab balance. The sample is then sealed into an aluminum DSC test pan, and placed in a TA Instruments Q2000 DSC. Once loaded, the sample is heated to 180° C., and allowed to equilibrate for 3 minutes. After reaching equilibrium, the samples are cooled at a rate of 10° C./min to −90° C., and held isothermally for 5 minutes. Then, the specimen is re-heated at a rate of 10° C./min to 180° C. Data from these runs are analyzed using TA Instruments Universal Analysis software, to determine the glass transition temperature ($T_g$), melting temperature ($T_m$), crystallization temperature ($T_c$), and enthalpies of melting ($\Delta H_m$) and crystallization ($\Delta H_c$), and other desired properties. These properties are obtained during the first cooling and second heating phase of the test.

B. High Scan Rate Dynamic DSC (High Cooling Rate DSC)

Thin films of each sample (nominally 250 μm thick) are prepared via a Thermo Electron Universal Film Maker (model 19-030e), in combination with a SPECAC lab bench press, operating at a temperature of 170° C. and a pressure of 2 bar (10 seconds at 170° C. and 2 bar). Discs (6 mm in diameter) are cut from these films via a paper punch, and these specimens are sealed in light-weight aluminum pans. A sample weight of approximately 4 mg was employed for all the high scan rate experiments, regardless of the rate. This is not typical, but due to the low level of crystallinity, more material was required to get a good signal.

All high scan rate DSC experiments are performed using a PE Pyris Diamond DSC, equipped with a liquid nitrogen cryo cooling accessory, and operating with a 50:50 He:Ne purge gas flow of 50 mL/min.

Calibrations are performed at a scan rate of 10° C./min. Once calibrated at the lower scan rate, the system is also properly calibrated for higher scan rates. Samples are analyzed using the two following temperature profiles. A baseline file is run with two empty pans and this was employed to subtract out any baseline curvature from the sample runs. The runs are performed with one of the following temperature profiles, as shown in Table 5.

TABLE 5

| Scan Rate Parameters | |
|---|---|
| Low Scan Rates (LSR): | High Scan Rates (HSR): |
| Hold for 5 minutes (min) at 180° C. | Hold for 5 min at 200° C. |
| Cool from 180° C. to −90° C. at 20° C./min | Cool from 200° C. to −90° C. at 100° C./min |
| Hold for 2 min at −90° C. | Hold for 2 min at −90° C. |
| Heat from −90° C. to 180° C. at 150° C./min | Heat from −90° C. to 200° C. at 150° C./min |
| Hold for 2 min at 180° C. | Hold for 2 min at 200° C. |
| Cool from 180° C. to −90° C. at 40° C./min | Cool from 200° C. to −90° C. at 200° C./min |
| Hold for 2 min at −90° C. | Hold for 2 min at −90° C. |
| Heat from −90° C. to 180° C. at 150° C./min | Heat from −90° C. to 200° C. at 150° C./min |

Crystallization temperature and enthalpy at various cooling rates are listed in Table 6 below.

TABLE 6

Crystallization Temperature and Enthalpy at Various Cooling Rates

| Cooling rate ° C./min | $T_c$ (° C.) 80/20* (PBPE1/PBPE2) | $T_c$ (° C.) 90/10* (PBPE1/PP wax) | $T_c$ (° C.) 95/5* (PBPE1/PP wax) | ΔH (J/g) 80/20* (PBPE1/PBPE2) | ΔH (J/g) 90/10* (PBPE1/PP wax) | ΔH (J/g) 95/5* (PBPE1/PP wax) |
|---|---|---|---|---|---|---|
| 10 | 38.5 | 77.1 | 65.7 | 23.1 | 28.6 | 20.5 |
| 20 (HSR) | 29.5 | 68.9 | 62.3 | 20.2 | 23.0 | 19.7 |
| 40 (HSR) | 15.8 | 62.7 | 52 | 12.5 | 19.4 | 14.3 |
| 100 (HSR) | N/A | 47.4 | 43.2 | N/A | 18.0 | 4.0 |
| 200 (HSR) | N/A | 32.5 | 35.4 | N/A | 9.6 | 1.7 |

*proportions are in wt %, based on total weight of composition.
N/A: Not observed.

The cooling rate of 10° C./min is the conventional cooling rate. The cooling rates of 20° C./min, 40° C./min 100° C./min, and 200° C./min are high cooling rates, with the high scan rate performed for the high cooling rates. As shown in Table 6 above, the present adhesive compositions with PBPE/PP wax (90/10 and 95/5) have higher crystallization temperature at all cooling rates compared to the composition containing 80 wt % PBPE and 20 wt % HD-PE (PBPE2). The present adhesive compositions with PBPE/PP wax (90/10 and 95/5) are able to crystallize at the high cooling rates of 20° C./min, 40° C./min 100° C./min, and 200° C./min, as well as at the normal cooling rate of 10° C./min. The present adhesive compositions with PBPE/PP wax (90/10 and 95/5) exhibit a crystallization enthalpy greater than 1.5 J/g at the high cooling rates, with 1.7 J/g, 4.0 J/g, 14.3 J/g, and 19.7 J/g at the high cooling rates of 200° C./min, 100° C./min, 40° C./min, and 20° C./min, respectively, for the "95/5" composition. The composition with 80 wt % PBPE and 20 wt % HD-PE does not show any crystallization at 100° C./min cooling and 200° C./min cooling.

5. Laminate Production

Adhesive compositions for lamination were prepared using a 1 liter Moltani mixer. Two 600 g batches of each example adhesive composition were prepared. All ingredients were pre-melted at 150° C. for a minimum of 4 hours before mixing in the mixer. Two mixing stages were employed: 3 minutes at 60 rpm followed by 7 minutes at 120 rpm. The set temperature was 148° C. Examples of adhesive compositions (compositions 1-3) for laminate production are provided in Table 7 below.

TABLE 7

Adhesive Compositions for Laminate Production

|  | wt %* | wt %* | wt %* |
|---|---|---|---|
| Adhesive Composition | 1 | 2 | 3 |
| PBPE3 | 59.8 | 56.8 | 53.8 |
| Licocene 6102 (wax) |  | 3 | 6 |
| Regalite R1090 (tackifier) | 30 | 30 | 30 |
| Catenex T145 (oil) | 10 | 10 | 10 |
| Irganox 1010 | 0.2 | 0.2 | 0.2 |
| Brookfield Viscosity (mPa · s)@ 150° C. | 3843 | 3325 | 2837 |

*% = wt % based on total wt composition

Laminates with a 12 gsm hydrophobic polypropylene non-woven substrate (Fitesa)/adhesive composition/16 gsm breathable back-sheet (Clopay MicroPro FPS K-16M) configuration were produced as described above (180° C. Peel Test) with the example adhesive compositions (compositions 1-3). The laminates were tested for initial peel force and peel force after aging 14 days at 40° C. in accordance with ISO 11339 (180° peel test configuration, clamp separation speed of 300 mm/min) as described above (180° C. Peel Test). Properties of the adhesive compositions 1-3 in the laminate are provided in Table 8 below. The inventive adhesive compositions show excellent adhesion results.

TABLE 8

Average Peel Force*

| Adhesive Composition | 2 g coating weight/ initial peel force | 2 g coating weight/peel force (14 days at 40° C.) | 3 g coating weight/ initial peel force | 3 g coating weight/peel force (14 days at 40° C.) | 5 g coating weight/ initial peel force | 5 g coating weight/peel force (14 days at 40° C.) |
|---|---|---|---|---|---|---|
| Composition 1 | 2.25 | 2.45 | 2.25 | 2.30 | 3.90 | 4.20 |
| Composition 2 | 2.30 | 2.40 | 3.10 | 3.20 | 4.30 | 4.25 |
| Composition 3 | 2.10 | 2.45 | 3.40 | 3.00 | 4.00 | 4.45 |

*Average peel force is measured in accordance with ISO 11339 (180° peel test configuration, clamp separation speed of 300 mm/min) as described above (180° C. Peel Test). Results are reported in N/25 mm.

It is specifically intended that the present disclosure not be limited to the embodiments and illustrations contained herein, but include modified forms of those embodiments including portions of the embodiments and combinations of elements of different embodiments as come with the scope of the following claims.

The invention claimed is:

1. An adhesive composition comprising:
   A) a propylene based plastomer or elastomer (PBPE) comprising up to 15 wt % units derived from ethylene and having:
   (i) a Koenig B-value less than 1.0;
   (ii) a total unsaturation per mole of propylene from 0.010% to 0.030%;
   (iii) a density from 0.860 g/cc to 0.890 g/cc;
   (iv) a melt viscosity, at 177° C., from 1,000 mPa·s to 15,000 mPa·s;
   (v) a weight average molecular weight from 20,000 to 50,000 g/mole; and
   (vi) a Mw/Mn from 2.0 to 4.0.

2. The composition of claim 1, further comprising a propylene-based polymer wax.

3. The composition of claim 1, wherein the PBPE has a melt viscosity, at 177° C., from 5,000 mPa·s to 15,000 mPa·s.

4. The composition of claim 1, wherein the PBPE has a weight average molecular weight from 24,000 to 50,000 g/mole.

5. The composition of claim 1, wherein the PBPE has a density from 0.860 g/cc to 0.870 g/cc.

6. The composition of claim 1, wherein the PBPE has a melt viscosity, at 177° C., from 7000 mPa·s to 15,000 mPa·s.

7. The composition of claim 1, wherein the PBPE comprises from 10 wt % to 15 wt % units derived from ethylene.

8. The composition of claim 1, wherein the PBPE has a total unsaturation per mole propylene from 0.018% to 0.022%.

9. The composition of claim 2, wherein the propylene-based polymer wax is a metallocene-catalyzed propylene-based wax.

10. The composition of claim 9, wherein the propylene-based polymer wax has a density from 0.89 g/cc to 0.91 g/cc.

11. The composition of claim 1, comprising:
   (A) from 80 wt % to 95 wt % PBPE;
   (B) from 20 wt % to 5 wt % propylene-based polymer wax; and
   wherein the composition has a crystallization temperature (Tc) from 55° C. to 90° C.

12. The composition of claim 11, wherein the composition has a secant modulus (100%) from 6.5 kPa to 40 kPa.

13. The composition of claim 1, comprising from 10 wt % to 30 wt % tackifier.

14. The composition of claim 1, comprising from 10 wt % to 30 wt % oil.

15. The composition of claim 1, wherein the composition has a melt viscosity at 150° C. from 1000 mPa·s to 20,000 mPa·s.

16. The composition of claim 1, wherein the composition has a Tc from 20° C. to 65° C., when cooled at a rate of 40° C./min to 200° C./min.

17. An article comprising at least one component formed from the composition of claim 1.

18. An article comprising:
   a substrate; and
   an adhesive composition, according to claim 1, on at least one surface of the substrate.

19. The article of claim 18, wherein the substrate is a non-woven fabric.

20. The article of claim 18, wherein adhesive composition forms a seal between the at least one surface of the substrate and at least one surface of another substrate.

* * * * *